United States Patent [19]

Brocoff

[11] 4,104,191

[45] Aug. 1, 1978

[54] HYDROGEN GENERATION FROM FLUE GASES

[75] Inventor: Jack Brocoff, Fullerton, Calif.

[73] Assignee: Ralph M. Parsons Co., Pasadena, Calif.

[21] Appl. No.: 776,353

[22] Filed: Mar. 10, 1977

Related U.S. Application Data

[63] Continuation-in-part of Ser. No. 450,550, Mar. 13, 1974, Pat. No. 4,012,488.

[51] Int. Cl.$^2$ ................................................. C09K 3/00
[52] U.S. Cl. .................................. 252/188; 252/373; 75/35
[58] Field of Search ..................... 252/188, 373; 75/35

[56] References Cited

U.S. PATENT DOCUMENTS 3,909,446  9/1975  Mayashita ..................... 252/188 X Primary Examiner—Stephen J. Lechert, Jr.
Attorney, Agent, or Firm—Christie, Parker & Hale

[57] ABSTRACT

Flue gases as generated in the combustion of a carbonaceous fuel are extracted while at a high temperature, e.g. 2000° to 3800° F, and mixed with a fuel and converted in the presence of an oxidant such as air and/or steam to a thermally generated gas stream enriched in hydrogen and/or its equivalent carbon monoxide. Conversion efficiencies based on the hydrocarbon feed in excess of 100% are achievable.

8 Claims, 1 Drawing Figure

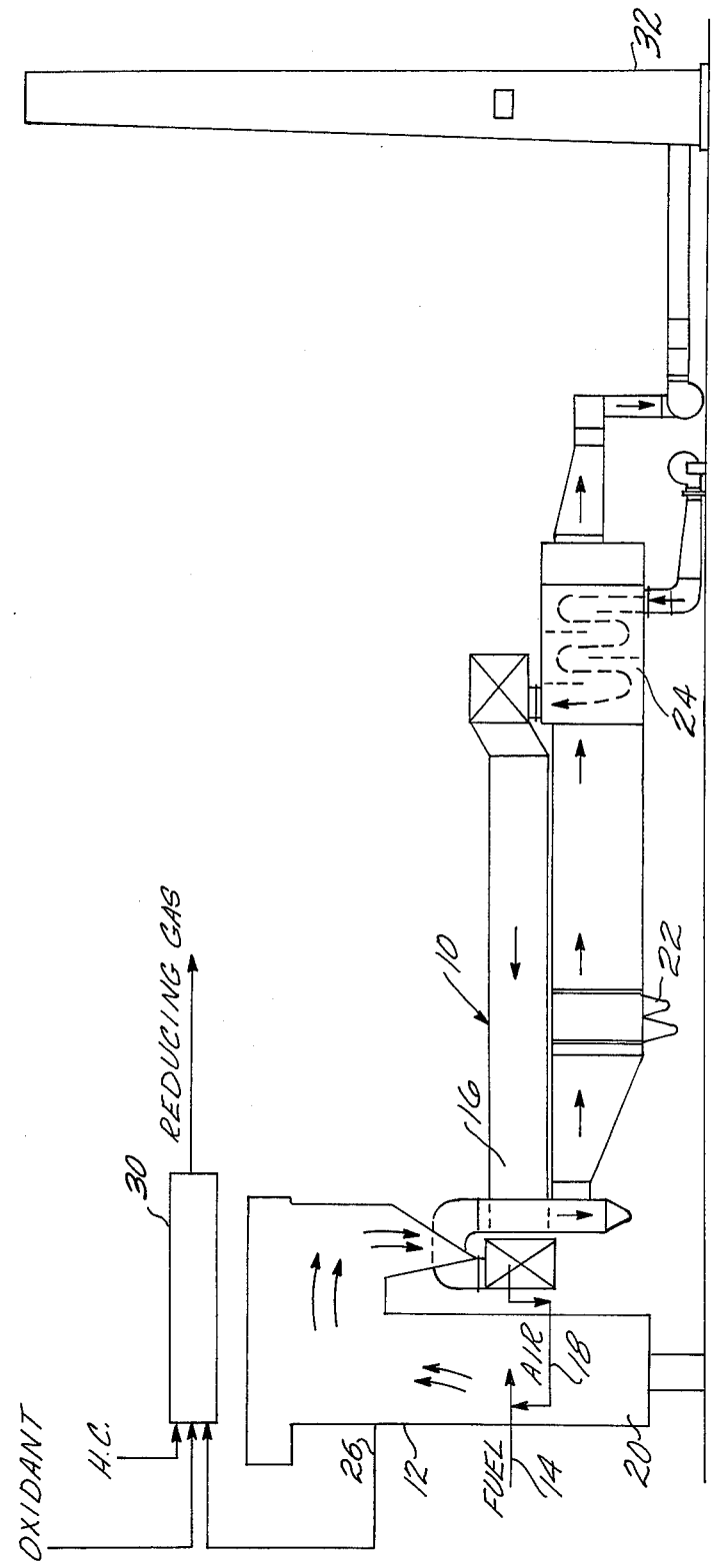

HYDROGEN GENERATION FROM FLUE GASES

CROSS REFERENCE TO RELATED APPLICATION

This application is a continuation-in-part of my Application Ser. No. 450,550 filed Mar. 13, 1974 now U.S. Pat. No. 4,012,488.

BACKGROUND OF THE INVENTION

In my parent application there was provided a method and apparatus to improve the recovery of fuel burning power generators and the like while minimizing emissions of sulfur and nitrogen to the atmosphere.

In the process as described, after combustion of a carbonaceous fuel such as coal, there is introduced a secondary hydrocarbon, such as methane, capable of forming a reducing gas into the combustion chamber to scavenge excess oxygen and create reducing atmosphere for the subsequent reduction of the oxides of sulfur to hydrogen sulfide and the oxides of nitrogen to inert nitrogen and/or ammonia with nitrogen formation being favored.

The gas stream is then allowed to pass through the remaining sections of the boiler and to an added catalytic conversion zone containing a catalyst capable of converting the oxides of sulfur to hydrogen sulfide by reaction with the hydrogen present in the reducing gas and the oxides of nitrogen by reaction with the reactants present to form inert nitrogen and/or ammonia at a temperature from about 300° to about 800° F.

Many other operations exist where there is a requirement for a reducing gas comprising hydrogen and/or carbon monoxide reductants, such as for regeneration of $SO_2$ absorbants, and reducing in external streams the oxides of sulfur and nitrogen. Usually such reducing gases prepared by reacting steam plus hydrocarbons at high temperatures (1200°–1800° F) over a catalyst. The principal chemical reactions which take place using methane as a typical hydrocarbon are:

(1)

(2)

Another method is to burn a hydrocarbon with substoichiometric air at elevated temperatures (2000°–3700° F). The principal chemical reactions taking place in this process are:

(3)

(4)

In both cases a relatively expensive hydrocarbon fuel must be used as the sole fuel and/or as the process material. In the commercial application via the steam methane reforming of (1) and (2) above, a fairly expensive furnace must be employed with high-alloy tubes to contain the catalyst and to withstand high furnace temperatures. The cost of such equipment is becoming prohibitively expensive.

SUMMARY OF THE INVENTION

According to the present invention, there is provided a more economical route to providing a reducing gas stream containing hydrogen and/or its equivalent carbon monoxide.

In the process of this invention high temperature gas streams generated in a reaction zone, such as the flue or combustion gases generated in furnace or present in the convection zones of the boiler, are extracted, combined with a carbon containing fuel and reacted in the presence of a quantity of an oxidant in a concentration stoichiometrically insufficient to convert all of the fuel to carbon dioxide, but sufficient to convert the carbon in the fuel to carbon monoxide. The mixture is allowed to adiabatically react to the resultant high temperature to produce a gas stream enriched in hydrogen and/or carbon monoxide.

In the process, the extracted gas stream is normally provided at a temperature between about 2000° F to about 3800° F. The amount of carbon containing fuel added is proportional to extracted gas temperature and will be added to provide a range from 5 to about 100 mols of carbon plus $H_2$ inclusive, preferably from about 15 to 50 mols per 100 mols of extracted gas. The use of high purity oxygen can permit higher than normal hydrocarbon additions by maintaining the net reaction products at a high temperature and avoiding nitrogen dilution. While conversions primarily occur thermally, a catalyst can be employed to speed the reaction, particularly especially where the extracted gas is at a temperature below about 2000° F with the normal precautions of preventing poisoning or masking of the catalyst.

DRAWING

The attached Drawing illustrates a typical embodiment of the practice of this invention.

DESCRIPTION

With reference first to the Drawing, in a power generator 10, the boiler 12 is supplied with a primary fuel normally a sulfur bearing carbonaceous fuel such as pulverized sulfur bearing coal or sulfur bearing hydrocarbon liquid in line 14 along with preheated air from duct 16 in conduit 18 to combustion section 20. Carbon values are completely consumed due to the addition of excess air, usually at least 1% to 25% and preferably 10 to 20% in excess of that required to convert the carbonaceous fuel to carbon dioxide and heat. The amount of excess air introduced depends on the nature of the carbonaceous fuel. As little as 1% excess air can be employed for gaseous to liquid fuels with at least 10% excess air being employed for normally solid fuels.

In addition to combustion zone 20, boiler 12 normally contains a radiant boiler section, a convection boiler section, and a high temperature economizer and may be followed by electrostatic precipitator 22 to remove fly ash. Other means to remove ash can also be employed. For instance, cyclone, bag filters and the like may also be employed. The air required for the combustion is blown into air preheater 24, and passes by duct 16 to the combustion zone, by conduit 18 normally at temperatures from 500° to 600° F.

A portion of the combustion products rather than utilized in transferring their heat by convection and radiation to boiler feed water are removed by line 26 from the high temperature section. The combustion gases will normally range from about 2000° to about 3800° F depending on the point of extraction.

The extracted gases which contain the carbon oxides as well as unconsumed oxygen pass to reactor 30 where there is introduced a hydrocarbon (H.C.) and a gaseous oxidant for the hydrocarbon to the extent the oxidant is not provided in the form of unconsumed oxygen in the extracted combustion gases.

The fuel employed may be carbon containing reactants capable of reaction in the gas phase at the temperatures provided without appreciable formation of soot. Exemplary of such fuels include hydrocarbons, methane, ethane, propane, the butanes, atomized or vaporized liquids and the like with natural gas preferred for reason of economy. Finely divided solid fuels such as coal and char may also be used.

The oxidant may be a source of oxygen, typically air or oxygen of higher purity than air and/or steam.

The extracted high temperature gas serves as a media to initiate and promote the thermal conversion of the hydrocarbons to hydrogen and/or its equivalent carbon monoxide in a stoichiometric deficiency of the oxidant. The principle reactions to occur are (1) to (4) above with reaction (1), for instance, being generalized, depending on the hydrocarbon to:

$$C_nH_m + (n/2 + m/4) O_2 \rightarrow n\, CO + m/2\, H_2O \qquad (5)$$

In addition, carbon dioxide to the extent present may reduce to carbon monoxide increasing conversion efficiency based on the hydrocarbon fed to, under certain circumstances, over 100%.

The amount of carbon containing fuel fed will provide a total equivalent of from about 5 to about 100, preferably from about 15 to about 50 mols of carbon and $H_2$ as present in the feed per 100 mols of extracted gas. For example, a mole of metrane is equivalent to one mole of carbon and two moles of $H_2$. The amount added is dependent on and proportional to temperature of the flue gas. Effective conversions of over 100% are realized for hydrocarbon feeds of 10 mols or more per 100 mols of flue gas. Reaction is allowed to be carried out adiabatically to a new but somewhat reduced temperature. High purity oxygen can be used to avoid contributing nitrogen to the product and may not become involved in $CO_2$ production.

The product reducing gas contains appreciable hydrogen and/or its equivalent carbon monoxide. The latter forms hydrogen on reaction with water via a water-gas shift reaction.

To the extent the products of the combustion are not extracted, they are used for power generation and exhausted to stack 32.

Some of the advantages of my process are that the heating fuel source is inexpensive coal or residual fuel oil used to fire the boiler. No heat transfer surfaces of expensive metals are required and no catalyst that may be susceptible to poisoning or subject to carbon deposition, are required, and accordingly the process is inherently cheaper, more flexible and more rugged. If, however, more rapid reaction rates, particularly at temperatures below 2000° F are desired, a catalyst may be employed but then, the usual precautions must be observed to guard against poisoning or masking the catalyst.

Another advantage of this invention is that heat from the combustion gases can be transferred most efficiently and economically to produce steam at the high temperature and the gases extracted after cooling, at the desired temperature for the efficient promotion of reactions (1) or (3). Reaction (4) serves only to increase the temperature of the reaction mix.

EXAMPLE 1

To an extracted flue gas mixture shown below there is added natural gas (shown as $CH_4$) as follows in Table I.

Table I

|  | Flue Gas Lb. mols/hr. | $CH_4$ Stream Lb. mols/hr. |
|---|---|---|
| $CH_4$ | — | 5.0 |
| $CO_2$ | 14.45 |  |
| $H_2O$ | 8.58 |  |
| $O_2$ | 2.70 |  |
| $SO_2$ | 0.27 |  |
| $N_2$ | 74.00 |  |
|  | 100.00 |  |
| Pressure PSIA | 14.7 | 14.7 |
| Temperature ° F | 2500 | 60 |

The adiabatic reaction temperature achieved is 2367° F and the equilibrium composition of the product gases is shown in Table II.

Table II

|  | Lb. mols/hr. |
|---|---|
| CO | 9.42 |
| COS | 0.01 |
| $CO_2$ | 10.02 |
| $H_2$ | 4.57 |
| $H_2O$ | 13.85 |
| $H_2S$ | 0.16 |
| $N_2$ | 74.00 |
| $SO_2$ | 0.05 |
| $S_2$ | 0.02 |
| S | 0.01 |
| Total | 112.11 |

EXAMPLE 2

With the flue gas mixture as in Example 1, there is added 10 mols of $CH_4$. The adiabatic reaction temperature reached is 1742° F and the product gas consisted of the following components shown in Table III.

Table III

|  | Mols/hr. |
|---|---|
| CO | 16.77 |
| COS | 0.01 |
| $CO_2$ | 7.67 |
| $H_2$ | 17.02 |
| $H_2O$ | 11.30 |
| $H_2S$ | 0.26 |
| $N_2$ | 74.00 |
| Total | 127.03 |

While in Example 1, 9.42 mols of CO and 4.57 mols of $H_2$ were formed for a total of 13.99 mols or 93.3% conversion efficiency based on reaction (3) above, in this Example 43.79 mols of CO + $H_2$ were formed from 10 mols of $CH_4$ or 146% conversion efficiency based on reaction (3). This is due to the reduction of part of the $CO_2$ to CO.

EXAMPLE 3

The flue gas of Example 1 is extracted at 3500° F instead of 2500° F. There is added 15 mols/hr of $CH_4$ instead of 10 mols/hr. There is achieved a mix temperature above 2000° F. The mix is far removed from the conditions for carbon formation. Table IV shows the reactant, product gas composition and operating conditions.

Table IV

|  | Reactants | | Product Gas |
|---|---|---|---|
|  | Mols/hr. | Mols/hr. | Mols/hr. |
| CO |  |  | 25.26 |
| COS |  |  | .01 |
| $CO_2$ | 14.45 |  | 4.18 |
| $H_2$ |  |  | 28.53 |
| $H_2O$ | 8.58 |  | 9.79 |
| $H_2S$ |  |  | .26 |
| $N_2$ | 74.0 |  | 74.00 |

Table IV-continued

|  | Reactants | | Product Gas |
| --- | --- | --- | --- |
|  | Mols/hr. | Mols/hr. | Mols/hr. |
| $O_2$ | 2.7 | | |
| $SO_2$ | 0.27 | | |
| $CH_4$ | | 15.0 | |
|  | 100.0 | 15.0 | 142.03 |
| Pressure PSIA | 14.7 | 14.7 | 14.7 |
| Temperature °F | 3500 | 60 | 2025 |

In this Example, the yield of $H_2 + CO$ was 53.79 mols/hr. or 120% yield efficiency based on reaction (3) above.

EXAMPLE 4

In this Example, steam is used as the oxidant. The composition of the feed and product gases and net conditions are summarized in Table V.

Table V

|  | Reactants | | Product Gas Mols/Hr. |
| --- | --- | --- | --- |
|  | Flue Gas Mols/Hr. | Hydrocarbons + Steam Mols/Hr. | |
| CO | | | 21.43 |
| COS | | | .01 |
| $CO_2$ | 14.45 | | 8.01 |
| $H_2$ | | | 32.35 |
| $H_2O$ | 8.58 | 15.00 | 20.95 |
| $H_2S$ | | | .26 |
| $N_2$ | 74.00 | | 74.00 |
| $O_2$ | 2.70 | | |
| $SO_2$ | 0.27 | | |
| $CH_4$ | | 15.00 | |
| Total | 100.00 | 30.00 | 157.1 |
| Temperature °F | 3500 | 212 | 1873 |
| Pressure PSIA | 14.7 | 14.7 | 14.7 |

The conversion efficiency of $CH_4$ to $CO + H_2$ for Example 4 is the same as for Example 3, i.e. 120% based on Equation (3).

The foregoing invention is not limited to boiler flue gases but may be applied to any process where a gas is available at a high temperature such as smelters, roasters, lime kilns, cement kilns, blast furnaces and magenetohydrodynamic power generating channels and the like.

What is claimed is:

1. A process for the production of a reducing gas which comprises:
   (a) extracting a high temperature gas from a reaction zone at a temperature sufficiently high to promote thermal reactions between an oxidant and an added hydrocarbon;
   (b) adding to the extracted high temperature gas a carbon containing fuel in an amount to provide the sum of from about 5 to about 100 mols of carbon and $H_2$ per 100 mols of extracted gas; and
   (c) thermally converting the carbon containing fuel in the presence of a gaseous oxidant provided in a quantity sufficient to convert the carbon present in the fuel to carbon monoxide, but insufficient to convert all of the carbon in the fuel to carbon dioxide to form a resultant high temperature reducing gas containing a reductant selected from the group consisting of hydrogen, carbon monoxide and mixtures thereof.

2. A process as claimed in claim 1 in which the extracted gas is at a temperature from about 2000° to about 3800° F.

3. A process as claimed in claim 1 in which the oxidant is selected from the group consisting of water, oxygen and mixtures thereof.

4. A process as claimed in claim 1 in which the fuel provides the sum of from about 15 to about 50 mols of carbon and $H_2$ per 100 mols of extracted gas.

5. A process for the production of a reducing gas which comprises:
   (a) extracting from a reaction zone a high temperature gas at a temperature from about 2000° to about 3800° F;
   (b) adding to the extracted high temperature gas a carbon containing fuel in an amount to provide the sum of from about 5 to about 100 mols of carbon and $H_2$ per 100 mols of extracted gas;
   (c) thermally converting the fuel in the presence of a gaseous oxidant selected from the group consisting of oxygen, water and mixtures thereof and provided in a quantity sufficient to convert all of the carbon in the fuel to carbon monoxide, but insufficient to convert all of the carbon in the fuel to carbon dioxide to form a resultant high temperature reducing gas containing a reductant selected from the group consisting of hydrogen, carbon monoxide and mixtures thereof.

6. A process as claimed in claim 5 in which the fuel provided the sum of from about 15 to about 50 mols of carbon and $H_2$ present per 100 mols of extracted gas.

7. A process for the generation of a reducing gas from combustion products which comprises:
   (a) combusting in a combustion zone of a boiler and in the presence of excess air a carbonaceous fuel to form a high temperature flue gas comprising the oxides of carbon, water and uncombined oxygen;
   (b) extracting a portion of the flue gas from the combustion zone, the extracted flue gas having a temperature from about 2000° to about 3800° F;
   (c) adding to the extracted flue gas a carbon containing fuel in an amount to provide the sum of from about 5 to about 100 mols of carbon and $H_2$ per 100 mols of extracted flue gas; and
   (d) thermally converting the fuel in the presence of an oxidant selected from the group consisting of water, oxygen and mixtures thereof provided in a quantity sufficient to convert all of the carbon present in the fuel to carbon monoxide, but insufficient to convert all carbon in the hydrocarbon to carbon dioxide to form a resultant high temperature reducing gas comprising hydrogen, carbon monoxide and mixtures thereof.

8. A process as claimed in claim 7 in which the fuel is provides the sum of from about 15 to about 50 mols of carbon and $H_2$ per 100 mols of flue gas.

* * * * *